No. 733,608. PATENTED JULY 14, 1903.
G. VAN MEURS.
NEEDLE FRAME FOR SPINNING MACHINES.
APPLICATION FILED JULY 14, 1900.
NO MODEL. 2 SHEETS—SHEET 1.
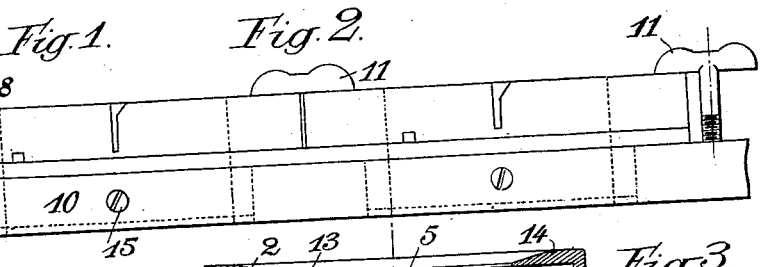
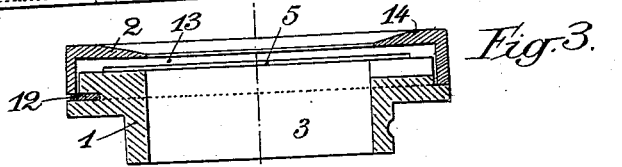
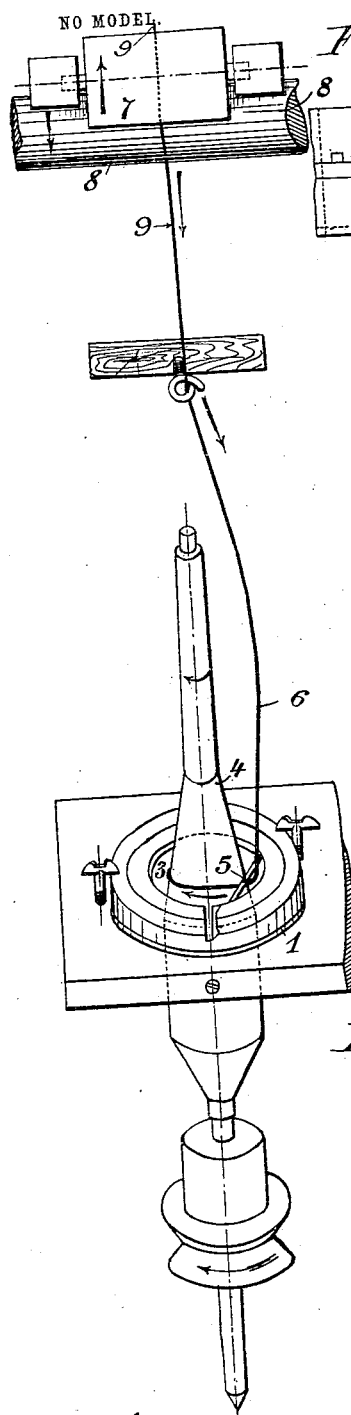
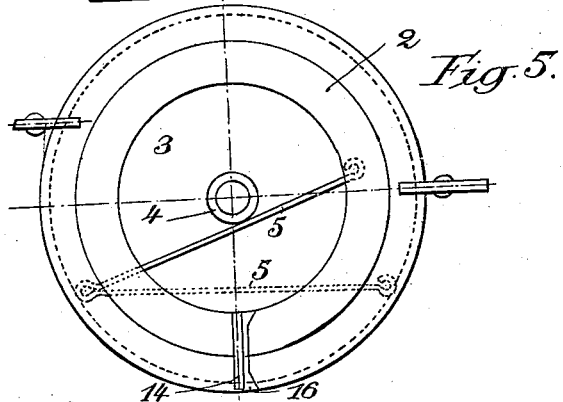
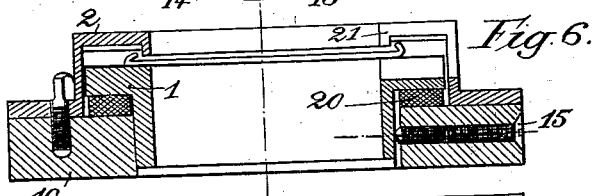
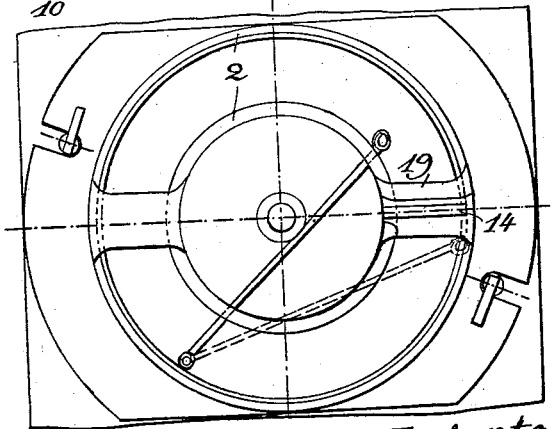
Witnesses:
Anton A. Gloetzner
A. Mitchell
Inventor:
Gustave Van Meurs,
by Max ... attorney.
THE NORRIS PETERS CO., PHOTO-LITHO., WASHINGTON, D. C.

No. 733,608. PATENTED JULY 14, 1903.
G. VAN MEURS.
NEEDLE FRAME FOR SPINNING MACHINES.
APPLICATION FILED JULY 14, 1900.
NO MODEL. 2 SHEETS—SHEET 2.
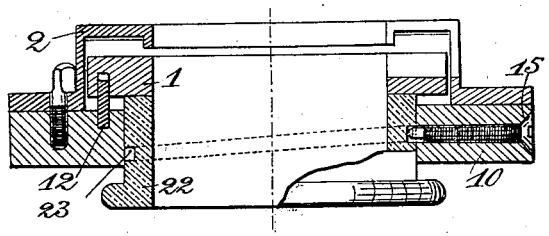
Fig. 10.
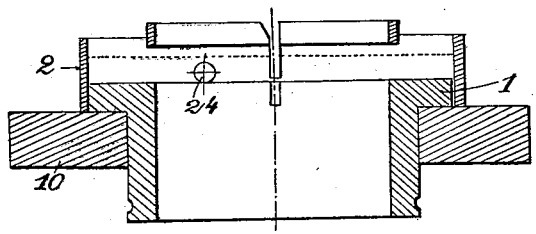
Fig. 11.
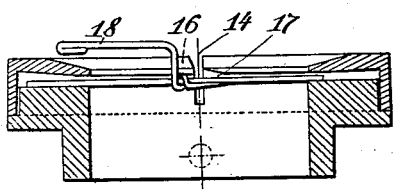
Fig. 4.
Fig. 9.
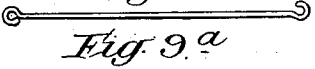
Fig. 9.ª
Fig. 9.ᵇ
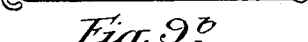
Fig. 9.ᶜ
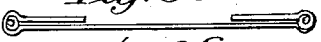
Fig. 9.ᵈ
Fig. 9.ᵈ'
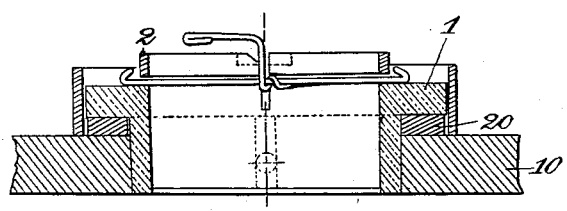
Fig. 7.
Fig. 9.ᵉ
Fig. 9.ᶠ
Witnesses:
Anton A. Gloetzner
A. Mitchell
Inventor:
Gustave Van Meurs,
by Max Stengli
Attorney.
THE NORRIS PETERS CO., PHOTO-LITHO., WASHINGTON, D. C.

No. 733,608. Patented July 14, 1903.

UNITED STATES PATENT OFFICE.

GUSTAVE VAN MEURS, OF GHENT, BELGIUM.

NEEDLE-FRAME FOR SPINNING-MACHINES.

SPECIFICATION forming part of Letters Patent No. 733,608, dated July 14, 1903.

Application filed July 14, 1900. Serial No. 23,635. (No model.)

*To all whom it may concern:*

Be it known that I, GUSTAVE VAN MEURS, engineer, a citizen of Belgium, residing at 410 Chaussee de Termonde, Ghent, in the Kingdom of Belgium, have invented certain new and useful Improvements in Needle-Frames for Spinning-Machines, of which the following is a clear description.

This invention relates to an arrangement for the continuous spinning of wool and cotton (untwisted wefts, warps, twistings) and other textile materials; and it consists in a frame or box with a needle having an alternating vertical movement, the needle being straight and poised or balanced in relation to the thread which runs below it and rounded off at its ends and being capable of turning freely around a spindle with a rotary motion for effecting the twisting and winding under tension on the said spindle of the thread produced by the roving coming from suitable cylinders.

By referring to Figures 1, 2, and 3 it will be seen that the needle-box consists substantially of a base or bottom 1 and a cover 2, both furnished with a central opening 3, through which the spindle 4 runs. The needle 5 is lodged in a space reserved for the purpose between the bottom and the cover and can turn and move freely on the upper surface of the bottom 1 around the spindle 4.

In examining Fig. 1 it will be observed that the roving 9 coming from the bobbin passes between the cylinders 7 and 8, the former acting as a pressing-cylinder. The thread 6 produced by the roving is then passed under the needle 5 and attached to the spindle 4. Thereupon if the spindle be rotated rapidly—for instance, at the rate of three thousand to four thousand revolutions per minute—while the cylinders 7 and 8 are turning at a relatively slow rate—say eighty revolutions per minute—and assuming that the needle-box is made stationary, the torsion and winding of the thread 6 under tension on the spindle 4 will be effected as follows: The thread 6 carried along by the spindle 4 will also carry along the needle 5 and will cause it to describe a circle around the spindle at the same time as the thread is subjected to torsional action. On the other hand, when the length of the thread increases between the spindle and the cylinders the needle will remain behind—that is to say, will turn less quickly—owing to this extension of its length and in consequence of its inertia and the centrifugal force which is acting on it. The result is that the thread 6 is wound on the spindle 4 at the same rate as it is given off from the cylinders at a tension which may be expressed by the weight of the needle augmented by the centrifugal force. In reality the needle-box is actuated by an irregular or regular alternating upward-and-downward motion in such a manner as to carry the thread onto the spindle, so as to form cop or bobbin.

In the accompanying drawings some forms of the boxes with a needle or with needles are represented by way of example.

Fig. 1 is a general view of the arrangement. Fig. 2 represents some needle-boxes arranged on the frame of the machine, partially shown. Figs. 3, 4, and 5 are vertical sections and a plan, respectively, of the needle-box represented in accordance with the first of the forms. Figs. 6, 7, and 8 are similar views of the needle-box according to the second form. Figs. 9, 9$^a$, and so on to 9$^g$ represent different forms of needles. Figs. 10 and 11 are vertical sections of the needle-box, showing different regulating arrangements.

In Fig. 2 the ring-frame of the spinning-frame is shown partially in elevation and carries two needle-boxes fixed by means of screws 11 and pressing-screws 15, the latter preventing the boxes from turning or being raised. The needle-boxes are illustrated in detail in Figs. 3, 4, and 5 and are each formed of a bottom 1 and a cover 2, prevented from turning by a headed bolt 11. The bottom 1 and the cover 2 are both provided with a central opening 3, through which the spindle 4 passes, and a hollow space 13 is arranged between the bottom and the cover in order to enable the needle 5 to move freely on the upper surface of the bottom 1. A cleft 14 is formed radially and carried to a suitable depth in the circumference of the base or bottom and of the cover, so as to enable the thread to be introduced into the box and to pass under the needle. A sloping edge or beveling is formed on the outside to the right of the cleft 14, so as to facilitate the introduction of the thread into such cleft, and, further, a slight incline 17 is formed on a suitable side of the cleft in order to avoid vibrations of the needle when the latter glides in front of the cleft. The needle represented as 5, Figs. 3 and 5, is simply rounded off at its ends, so that it may slide easily in front of the cleft 14 and may be kept straight. The needle is in equilibrium while winding upon the small diameter of the cop, because while it revolves about the spindle 4 the thread contacts exactly with its middle, as shown in Fig. 1, so that at each side of the said point of contact there is an equal length of needle, and hence an equal weight, thus avoiding any tendency of the needle to bind in the spinning-ring. In proportion as the winding takes place on a large or small cop or bobbin diameter the needle recedes from or approaches the spindle.

The needle, formed as a hook 18, (represented in Fig. 4,) may be employed for spinning high-number threads only when a rather heavy and strong steel needle is required. This needle is also balanced and may be set to work in the same boxes as the preceding one. Its ends are rounded off, so that it may slide easily in front of the cleft and that it may be kept straight. The long hook with which it is provided in the middle extends beyond the upper surface of the cover 2 and serves for hooking the thread without its being necessary for the latter to pass through the cleft 14. In order to introduce the needle into the box, the cover 2 is removed and is replaced again after the needle has been put onto the base or bottom 1.

For the purpose of passing the thread under the needle 5 without removing the cover 2 when, for example, the said thread is broken in the course of the work, the spindle 4 is stopped by means of a brake, a small quantity of the thread is unwound from the cop or bobbin, and the thread introduced into the cleft 14 until it comes below the level of the needle. The needle is then slid with the finger on the thread in front of the cleft into the position indicated by dots in Fig. 5 and the thread drawn out of the cleft. It is evident that for the passage of the thread the cleft 14 must always correspond with that in the cover.

The needle-box illustrated in Figs. 6, 7, and 8 differs from the preceding one in this, that the cover is cut out, as shown in those figures, in order to allow the ends of the fingers to reach the extremities of the needles when it is necessary that they should be moved. In this kind of box the cleft 14 of the cover is formed in one of the arms or branches supporting the interior circle of the cover, and it has the form previously indicated. Moreover, the distance between the bottom 1 and cover 2 must be capable of being regulated as desired accordingly as the number of thread requires a light thin needle or a heavy thick needle. This distance may be roughly regulated by means of spare disks 20, more or less thick, which are inserted between the ring-frame 10 and the bottom 1 of the box. It should further be remarked that with this kind of box the interior circle of the cover is provided with a shoulder or ledge 21, the object of which is to prevent the bent extremities of the needle from taking hold of the arms or branches 19. In order that it may not be necessary to change the disks 20 for each number of needles, the latter may be made heavier by lengthening them. Different forms of these needles, either straight or hooked, with a single or double eyelet or loop at their ends, turned up or not, &c., are shown in Figs. 9, 9ª, and so on to 9ᵉ. These needles are made of steel wire or any other suitable material.

The cover-piece 2 may be effectively regulated, as shown in Fig. 10, by means of a spiral groove formed in a piece 22, arranged beneath the bottom 1 and retained by the bolt 15, which engages in the spiral 23. In turning the piece 22 to the right or left it is raised or lowered and the piece 1 is brought nearer to or removed farther from the piece 2.

Fig. 11 shows a needle-box into which the needle can be introduced without the necessity of removing the cover 2. For this purpose a small hole 24 is formed in the side of the cover 2 in such a manner that when the piece 1 is lowered, as shown in Fig. 11, the needle may be put in onto the bottom of the same through the opening 24. The piece 1 is then raised again until its upper surface reaches the normal level, (indicated by dots,) and thus closes the opening 24, so as to prevent the needle from coming out of the box. The hole 24 may be employed, as is obvious, in all the arrangements described above for regulating the bottom 1.

The needle-frames or needle-boxes above described may be employed for spinning cotton, wool, or any other textile material, and the dimensions of the boxes vary according to the material to be spun, but the principle of the invention always remains the same.

The technical results obtained with the above-described needle-box are as follows: The employment of fine strong needles enables the spinning to be carried on at a great rate and the thread obtained is very round and glossy; further, by employing suitable needles the tension of the thread may be regulated while the thread is being wound around the spindle.

Having now particularly described and ascertained the nature of my said invention and in what manner the same is to be performed, I declare that what I claim is—

1. In a device of the character described, a spinning-ring having an annular groove in the wall of its bore, and a slot extending from the upper face of the spinning-ring downwardly to said groove.

2. In a device of the character described, a spinning-ring having an annular groove in the wall of its bore, and a radial slot extending from the upper face of the spinning-ring downwardly to said groove.

3. In a device of the character described, a spinning-ring having an annular groove in the wall of its bore, and a radially-disposed slot extending from the upper face of the spinning-ring downwardly to said groove, said slot being perpendicular to said upper face.

4. In a device of the character described, the spinning-ring having an annular groove in the wall of its bore, and a slot extending from the upper face of the spinning-ring downwardly to said groove, said spinning-ring having one edge of the slot beveled at the upper face.

5. In a device of the character described, a spinning-ring having an annular groove in the walls of its bore and a slot extending from the upper face of the spinning-ring downwardly to said groove, said spinning-ring having one edge of the slot beveled where it merges into said annular groove.

6. In a device of the character described, the combination of a spinning-ring having an annular groove in the wall of its bore and a slot extending from the upper face of the spinning-ring downwardly to said groove, and a needle loosely supported by the walls of said groove, said needle having its ends extended in the plane of said slot.

7. In a device of the character described, the combination of a spinning-ring having an annular groove in the wall of its bore and a slot extending from the upper face of the spinning-ring downwardly to said groove, and a needle loosely supported by the walls of said groove, said needle having its ends bent into hooks lying in the plane of said slot.

In testimony whereof I have signed this specification in the presence of two subscribing witnesses.

GUSTAVE VAN MEURS.

Witnesses:
GUSTAVE DE VREEDE,
FRANÇOIS VERHOEVEZ.